(12) United States Patent
Maher et al.

(10) Patent No.: US 10,895,125 B2
(45) Date of Patent: Jan. 19, 2021

(54) COMPLETION INTERFACE SYSTEMS FOR USE WITH SURFACE BOPS

(71) Applicant: Trendsetter Vulcan Offshore, Inc., Houston, TX (US)

(72) Inventors: James V. Maher, Houston, TX (US); Daniel McCelvey, Houston, TX (US)

(73) Assignee: Trendsetter Vulcan Offshore, Inc., Houston, TX (US)

(*) Notice: Subject to any disclaimer, the term of this patent is extended or adjusted under 35 U.S.C. 154(b) by 0 days.

(21) Appl. No.: 16/467,700

(22) PCT Filed: Dec. 11, 2017

(86) PCT No.: PCT/US2017/065595
§ 371 (c)(1),
(2) Date: Jun. 7, 2019

(87) PCT Pub. No.: WO2018/107160
PCT Pub. Date: Jun. 14, 2018

(65) Prior Publication Data
US 2019/0360294 A1     Nov. 28, 2019

Related U.S. Application Data

(60) Provisional application No. 62/432,403, filed on Dec. 9, 2016.

(51) Int. Cl.
| | |
|---|---|
| *E21B 33/043* | (2006.01) |
| *E21B 33/035* | (2006.01) |
| *E21B 33/06* | (2006.01) |
| *E21B 33/064* | (2006.01) |
| *E21B 33/038* | (2006.01) |

(Continued)

(52) U.S. Cl.
CPC .......... *E21B 33/043* (2013.01); *E21B 17/01* (2013.01); *E21B 17/085* (2013.01); *E21B 17/1085* (2013.01); *E21B 19/006* (2013.01); *E21B 33/035* (2013.01); *E21B 33/062* (2013.01); *E21B 33/064* (2013.01); *E21B 17/046* (2013.01); *E21B 19/165* (2013.01); *E21B 33/038* (2013.01); *F16L 37/08* (2013.01)

(58) Field of Classification Search
None
See application file for complete search history.

(56) References Cited

U.S. PATENT DOCUMENTS

| | | | |
|---|---|---|---|
| 3,638,721 A * | 2/1972 | Harrison | ............... E21B 33/064 166/351 |
| 4,444,404 A | 4/1984 | Parks, Jr. | |

(Continued)

OTHER PUBLICATIONS

International Search Report and Written Opinion for parent PCT application PCT/US2017/065595, 18 pages.

*Primary Examiner* — Giovanna Wright
*Assistant Examiner* — Dany E Akakpo
(74) *Attorney, Agent, or Firm* — Jonathan Pierce; Pierre Campanac; Porter Hedges LLP

(57) ABSTRACT

A surface joint provides a sealing interface between pipe rams or variable-bore rams of a surface blowout preventer and a landing string. The surface joint may be used in a system including the surface blowout preventer, a subsea mudline closure device having a conventional configuration without additional pipe rams or variable-bore rams used to close on a slip joint, and a high-pressure riser.

23 Claims, 4 Drawing Sheets

(51) Int. Cl.
*E21B 17/01* (2006.01)
*E21B 17/08* (2006.01)
*E21B 19/00* (2006.01)
*E21B 17/10* (2006.01)
E21B 17/046 (2006.01)
E21B 19/16 (2006.01)
F16L 37/08 (2006.01)

(56) References Cited

U.S. PATENT DOCUMENTS

| | | |
|---|---|---|
| 5,253,713 A | 10/1993 | Gregg et al. |
| 6,089,526 A | 7/2000 | Olson |
| 7,056,027 B2 | 6/2006 | Puckett |
| 7,571,772 B2 | 8/2009 | Reams |
| 2008/0031692 A1 | 2/2008 | Wybro et al. |
| 2015/0144356 A1 | 5/2015 | DeOcampo et al. |

\* cited by examiner

COMPLETION INTERFACE SYSTEMS FOR USE WITH SURFACE BOPS

BACKGROUND

This disclosure relates generally to methods and apparatus for completion of subsea wells using a surface blowout preventer ("BOP").

For subsea wells, a subsea BOP is traditionally provided on the seafloor. When a subsea BOP is provided, the design of the landing string that is used to suspend the completion tools usually requires a slip joint that is disposed around the landing string at the depth where the subsea BOP is provided. The slip joint has an outer surface on which the pipe rams or variable-bore rams ("VBRs") of the subsea BOP can close. Closing the rams provides a seal that can be used in operations involving pressurization of the annulus around the landing string—in a completion setting operation utilizing pressure in the annulus, and/or as a contingency measure, as examples.

When a surface BOP, a mudline closure device ("MCD"), and a high-pressure riser are provided instead of a subsea BOP and a standard riser, a slip joint could also be disposed around the landing string at the depth where the MCD is provided. This design, however, would require the use of pipe rams or VBRs on the MCD to seal around the slip joint. Although providing such pipe rams or VBRs on the MCD is possible, this design is not preferable because it increases the complexity of the MCD, and diminishes the advantage of using the MCD on the seafloor and a surface BOP instead of a subsea BOP.

Thus, there is a continuing need in the art for methods and apparatus for completion of subsea wells using a surface BOP.

BRIEF SUMMARY OF THE DISCLOSURE

The disclosure describes a completion interface for use with a surface blowout preventer. The completion interface comprises a portion of a landing string and a surface joint. The surface joint includes a cylindrical body having an outer radial surface and a central longitudinal axis. The cylindrical body includes a first axial passageway traversing through the cylindrical body. The first axial passageway is sealed against the portion of the landing string. The surface joint also includes castellations projecting radially outward from the outer radial surface of the cylindrical body to an outer diameter of the surface joint. The castellations are spaced along the central longitudinal axis. The castellations define a plurality of grooves.

The disclosure also describes a system for use in completion operation. The system comprises a surface blowout preventer having at least one variable-bore ram. The system further comprises a landing string and a surface joint. The surface joint includes a cylindrical body having an outer radial surface and a central longitudinal axis. The cylindrical body includes a first axial passageway traversing through the cylindrical body. The first axial passageway is sealed against a portion of the landing string. The surface joint includes castellations projecting radially outward from the outer radial surface of the cylindrical body to an outer diameter of the surface joint. The castellations are spaced along the central longitudinal axis. The castellations define a plurality of grooves. Any of the plurality of grooves is configured to be sealingly engaged by the at least one variable-bore ram.

The disclosure also describes a method for performing completion operation. The method comprises lowering a lower portion of a landing string in a subsea well. The method further comprises providing the surface joint. The method further comprises connecting the upper portion of the landing string to the lower portion of the landing string. The method further comprises inserting the surface joint in a surface blowout preventer having at least one variable-bore ram. The method further comprises sealingly engaging one of the plurality of grooves with the at least one variable-bore ram.

BRIEF DESCRIPTION OF THE DRAWINGS

For a more detailed description of the embodiments of the disclosure, reference will now be made to the accompanying drawings, wherein.

DETAILED DESCRIPTION

Figure 1:
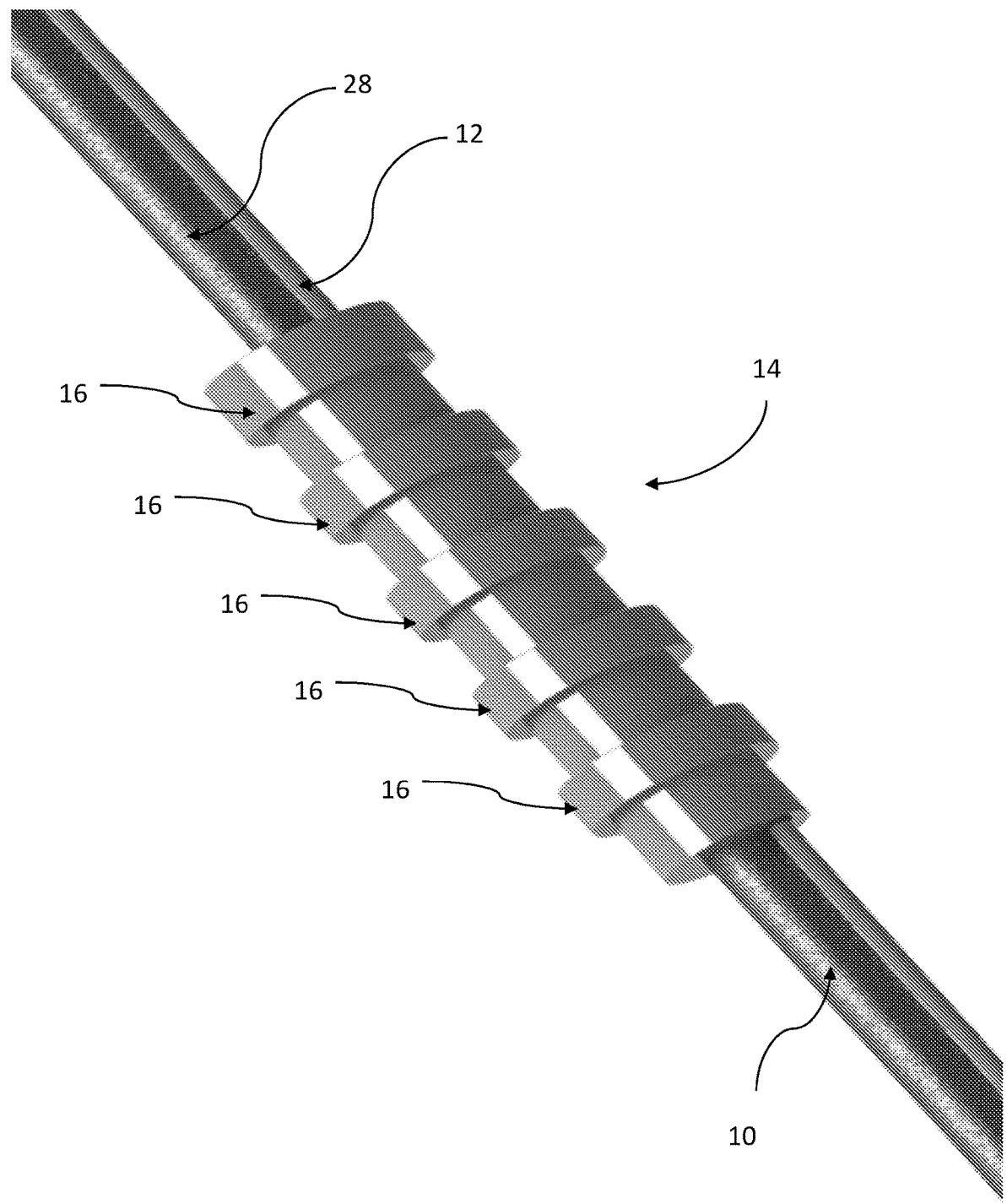
FIG. 1 is a perspective view of completion interface system including a surface joint disposed around a landing string.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

All numerical values in this disclosure may be approximate values unless otherwise specifically stated. Accordingly, various embodiments of the disclosure may deviate from the numbers, values, and ranges disclosed herein without departing from the intended scope. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In the following discussion and in the claims, the terms "including" and "comprising" are used in an open-ended fashion, and thus should be interpreted to mean "including, but not limited to." Furthermore, as it is used in the claims or specification, the term "or" is intended to encompass both exclusive and inclusive cases, i.e., "A or B" is intended to be synonymous with "at least one of A and B," unless otherwise expressly specified herein.

Certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function.

The disclosure describes a surface joint that can provide a sealing interface between pipe rams or VBRs of a surface BOP and a landing string. The surface joint may be used in a system including a surface BOP, a subsea MCD having a conventional configuration without additional pipe rams or VBRs used to close on a slip joint, and a high-pressure riser.

It may be advantageous to provide the surface joint with a capability to engage with the pipe rams or VBRs in such a way that the landing string can be hung on the surface BOP, thereby eliminating the relative motion between the surface BOP and the landing string and/or loads on the completion tools (e.g., a sand screen, a gravel pack, and/or packers, a tubing hanger running tool, etc.) suspended to the landing string. Because the total stack-up lengths are not precisely known for both the landing string and the high-pressure riser, and the depth of the formation to be completed is also not completely known, the surface joint is advantageously capable of engaging with the pipe rams or VBRs at any of a plurality of spaced-out locations so that the imprecision of the knowledge of the stack-up lengths or the formation depth are mitigated.

In addition, when the surface joint is capable of engaging with the pipe rams or VBRs at a plurality of spaced-out locations, the design of the surface joint can be greatly simplified with respect to the design of a traditional slip joint.

The control system for the completion tools that are suspended to the landing string is typically direct-hydraulic or multiplexed. The control system includes an umbilical that either comprises a large number of hydraulic lines or a smaller number of hydraulic lines and electric lines. The umbilical comprising the lines of the control system may be arranged through the surface joint.

Figure 2:
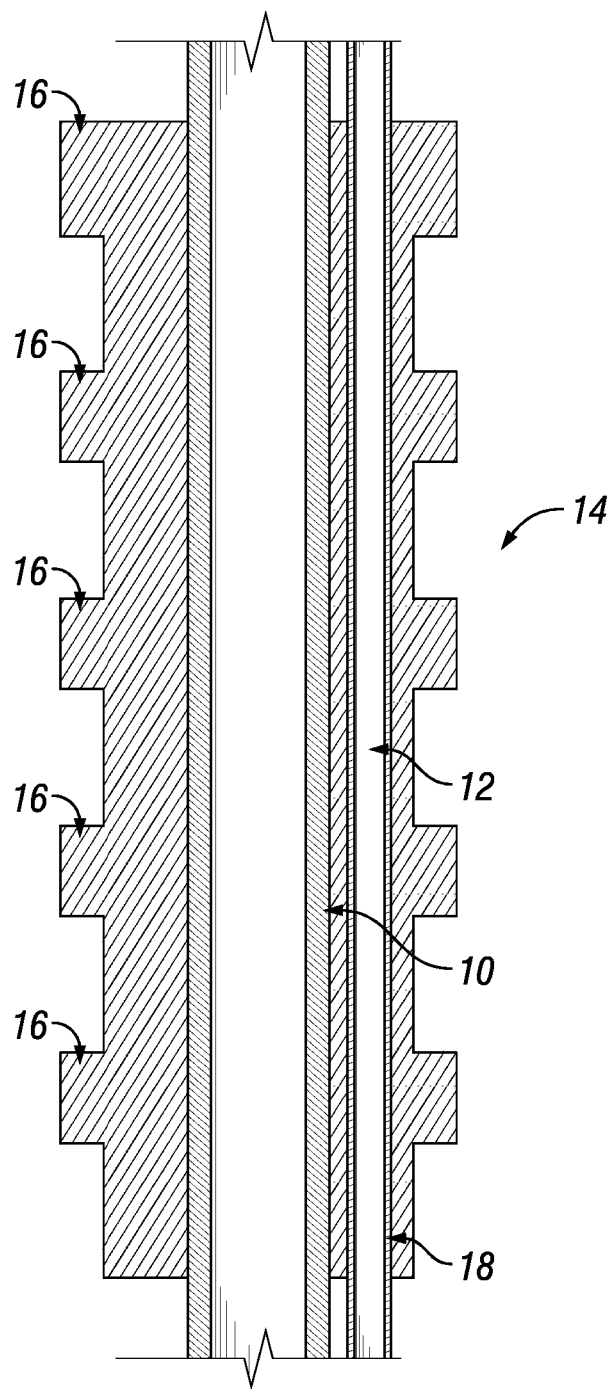
FIG. 2 is a sectional view of the completion interface system shown in FIG. 1.

Referring initially to FIGS. 1 and 2, a surface joint 14 is provided around a landing string 10. Castellations 16 are provided on the outer surface of the surface joint 14.

Above the surface joint 14, a typical shear joint 28 may be provided so that the landing string 10 can be sheared both at the surface BOP 22 as well as at the seafloor MCD. Such capability provides a safer and more redundant system than a typical subsea BOP where the landing string 10 may only be sheared by the subsea BOP.

Optionally, the surface joint 14 can be configured to have a large outer diameter (while still less than the inner diameter of the BOP) and can allow for an umbilical 12, which contains the lines of the control system, to be run directly through it. The umbilical 12 can be sealed using a seal gland 18 at the lower end of the surface joint 14.

Figure 3:
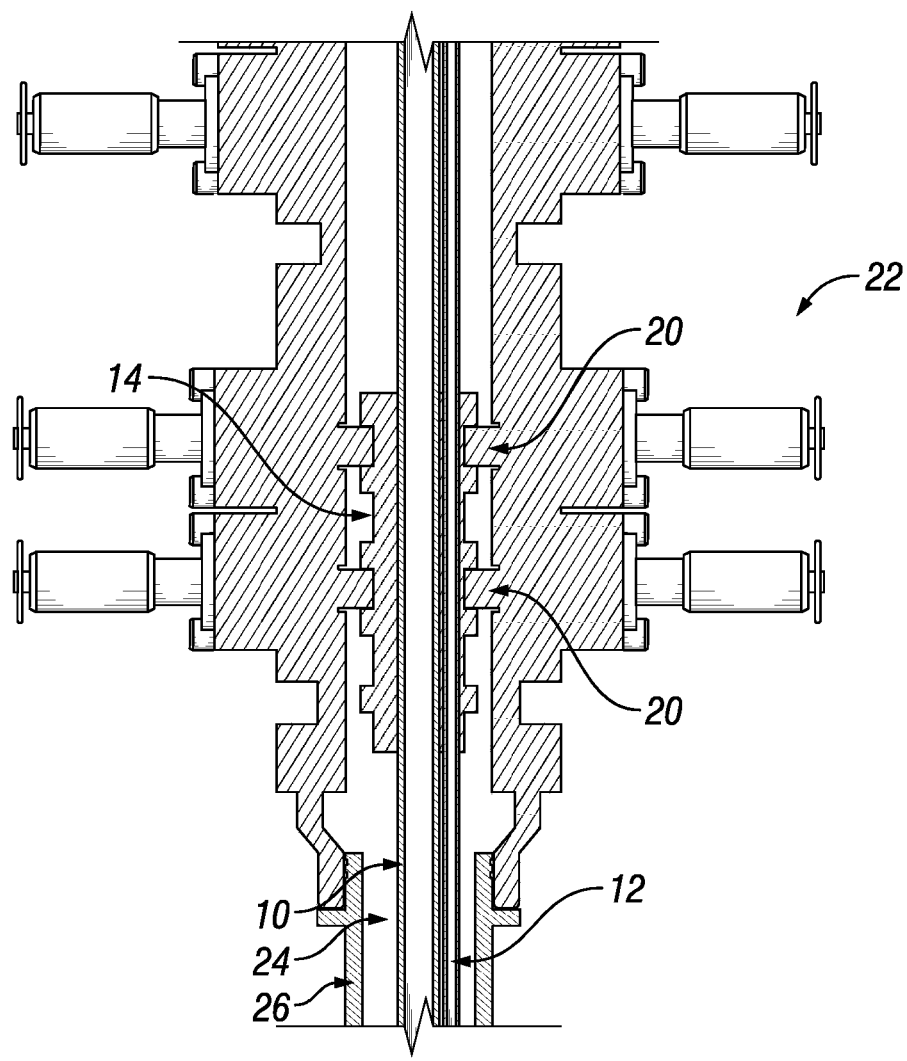
FIG. 3 is a sectional view of the completion interface system shown in FIG. 1, illustrated in use in a surface BOP.
Figure 4:
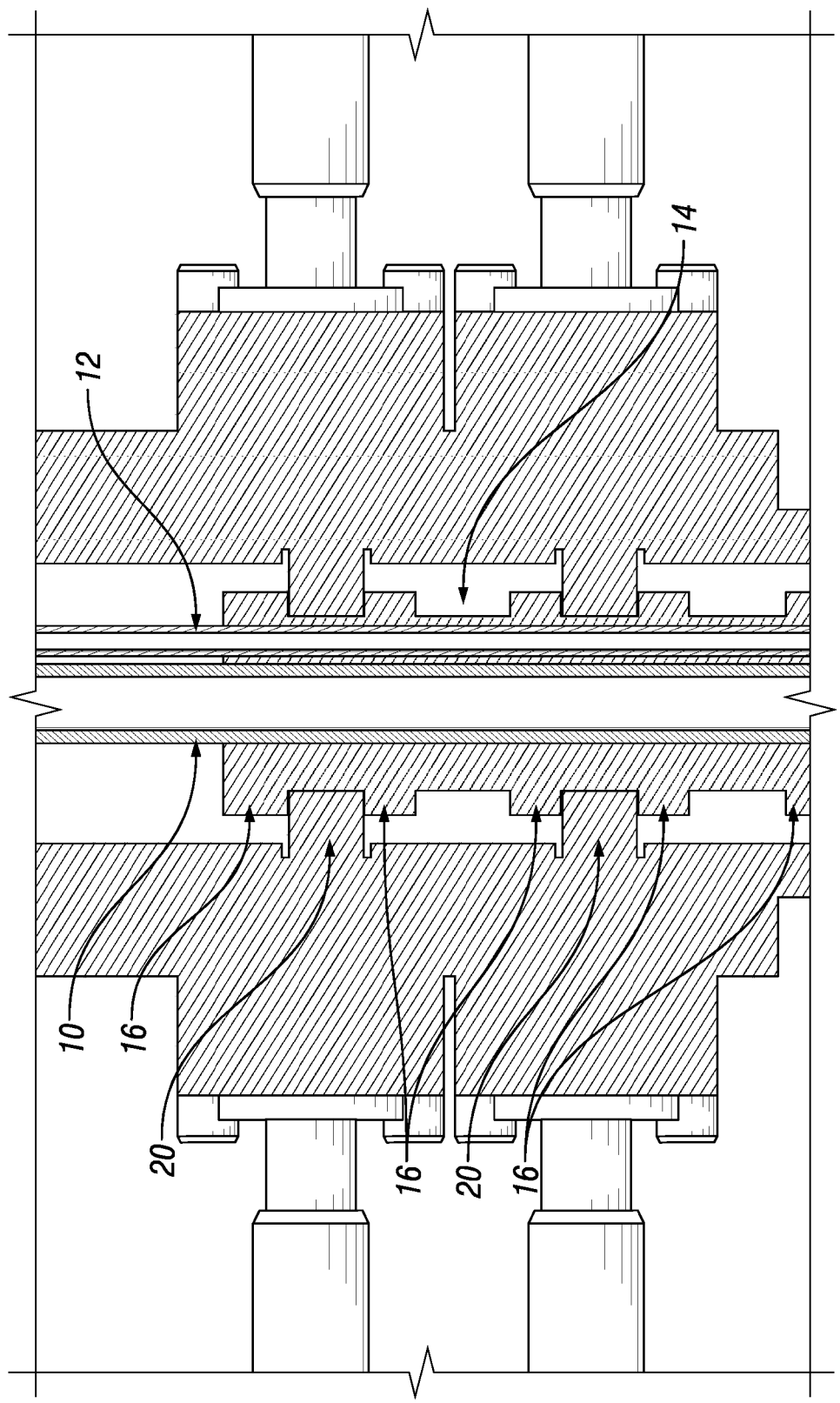
FIG. 4 is an enlarged portion of FIG. 3.

Turning to FIGS. 3 and 4, the castellations 16 allow the VBRs 20 of a surface BOP 22 to grab hold of the surface joint 14, support the landing string 10 and seal an annulus 24 around the landing string 10. The VBRs 20 are extended into one or more of the grooves between the castellations 16. Once the VBRs 20 are latched onto the surface joint 14, the landing string 10 and riser 26 are connected together, acting as a single assembly. This configuration may be similar to a dry tree well configuration.

In use, the completion tools (e.g., a sand screen, a gravel pack, and/or packers, a tubing hanger running tool, etc) are suspended to the landing string 10. The completion tools are positioned in the formation to be completed and anchored to the well casing while the landing string 10 is suspended to the derrick provided on the rig.

The one or more grooves into which the VBRs 20 extend may not be predetermined. The surface joint 14 is long enough so that when the completion is properly located in the formation, the VBRs 20 are located between the bottom of the surface joint 14 and the top of the surface joint 14 despite the imprecision of the knowledge of the stack-up lengths or the formation depth. This imprecision may only be on the order of several feet. Thus the length of surface joint 14 is also on the order of several feet.

In addition, the VBRs 20 of the surface bop 22 may not be exactly aligned with one of the grooves between the castellations 16. The misalignment can be easily made up by simply tensioning the landing string 10 in the riser 26 prior to the VBRs 20 of the surface BOP 22 grabbing hold of the surface joint 14. The tensioning of the landing string 10 can be done using the derrick. The spacing between the grooves in the castellation 16 is approximately equal to the height of the body of the VBRs 20, which is usually between 6 and 8 inches. Thus, the misalignment to be made up is at most between 6 and 8 inches. Given that the subsea wells are typically in the range of 3,000 to 12,000 feet of water depth, the amount of stress resulting from the tensioning required to make up the misalignment is therefore acceptable.

Sealing the umbilical 12 in a passageway of the surface joint 14 can be done through a variety of methods, including a pre-made up surface termination that can be fed through the surface joint 14 prior to engaging the tubing hanger running tool.

Another method is to position the seal gland 18 on the lower end of the surface joint 14. The seal gland 18 does not fully engage the umbilical 12 unless compression is applied on the seal gland 18.

The umbilical 12 can be run continuously through the surface joint 14 during the deployment of the completion and the landing string 10, and the seal around the umbilical 12 is only activated when a suitable length of the umbilical 12 is in the subsea well.

While the disclosure is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A completion interface for use with a surface blowout preventer, comprising:
   a portion of a landing string; and
   a surface joint including:
      a cylindrical body having an outer radial surface and a central longitudinal axis, the cylindrical body including a first axial passageway traversing through the cylindrical body, the first axial passageway being sealed against the portion of the landing string, wherein the cylindrical body further includes a second axial passageway traversing through the cylindrical body, and wherein the second axial passageway is radially offset from the first axial passageway; and
      castellations projecting radially outward from the outer radial surface of the cylindrical body to an outer diameter of the surface joint, wherein the castellations are spaced along the central longitudinal axis, and
wherein the castellations define a plurality of grooves.

2. The completion interface of claim 1, wherein the castellations surround an entire perimeter of the cylindrical body and each of the plurality of grooves is an annular groove located between two axially adjacent castellations.

3. The completion interface of claim 1 or 2, wherein spacings between grooves of the plurality of grooves are equal to a predetermined height.

4. The completion interface of claim 1, wherein the castellations are integral to the cylindrical body.

5. The completion interface of claim 1, wherein the first axial passageway is located essentially along the central longitudinal axis.

6. The completion interface of claim 1, wherein the first axial passageway is cylindrical, and wherein the second axial passageway is cylindrical.

7. The completion interface of claim 1, further comprising a seal gland disposed in the second axial passageway at a lower end of the cylindrical body.

8. A system for use in completion operation, comprising:
a surface blowout preventer having at least one variable-bore ram;
a landing string; and
a surface joint including:
a cylindrical body having an outer radial surface and a central longitudinal axis, the cylindrical body including a first axial passageway traversing through the cylindrical body, the first axial passageway being sealed against a portion of the landing string; and
castellations projecting radially outward from the outer radial surface of the cylindrical body to an outer diameter of the surface joint,
wherein the castellations are spaced along the central longitudinal axis,
wherein the castellations define a plurality of grooves,
wherein any of the plurality of grooves is configured to be sealingly engaged by the at least one variable-bore ram.

9. The system of claim 8, wherein the castellations surround an entire perimeter of the cylindrical body and each of the plurality of grooves is an annular groove located between two axially adjacent castellations.

10. The system of claim 8 or 9, wherein spacings between grooves of the plurality of grooves are equal to a height of a body of the at least one variable-bore ram.

11. The system of claim 8, wherein the castellations are integral to the cylindrical body.

12. The system of claim 8, further comprising:
completion tools suspended to the landing string; and
an umbilical for controlling at least one of the completion tools,
wherein the first axial passageway is located essentially along the central longitudinal axis,
wherein the cylindrical body further includes a second axial passageway traversing through the cylindrical body,
wherein the second axial passageway is radially offset from the first axial passageway, and
wherein the second axial passageway is configured to slidingly receive the umbilical.

13. The system of claim 12, wherein the first axial passageway is cylindrical, and wherein the second axial passageway is cylindrical.

14. The system of claim 12, further comprising a seal gland disposed in the second axial passageway at a lower end of the cylindrical body.

15. The system of claim 14, wherein the second axial passageway is selectively sealable around the umbilical by applying compression.

16. The system of claim 8, further comprising a shear joint connected on top of the landing string.

17. The system of claim 8, further comprising:
a mudline closure device located on the seafloor; and
a high-pressure riser connected on top of the mudline closure device,
wherein the surface blowout preventer is connected on top of the high-pressure riser.

18. A method for performing completion operation, comprising:
lowering a lower portion of a landing string in a subsea well;
providing a surface joint comprising:
a cylindrical body having an outer radial surface and a central longitudinal axis,
the cylindrical body including a first axial passageway traversing through the cylindrical body, the first axial passageway being sealed against an upper portion of the landing string; and
castellations projecting radially outward from the outer radial surface of the cylindrical body to an outer diameter of the surface joint,
wherein the castellations are spaced along the central longitudinal axis,
wherein the castellations define a plurality of grooves;
connecting the upper portion of the landing string to the lower portion of the landing string;
inserting the surface joint in a surface blowout preventer having at least one variable-bore ram; and
sealingly engaging one of the plurality of grooves with the at least one variable-bore ram.

19. The method of claim 18, further comprising supporting the landing string with the at least one variable-bore ram, wherein the castellations surround an entire perimeter of the cylindrical body and each of the plurality of grooves is an annular groove located between two axially adjacent castellations.

20. The method of claim 18 or 19, further comprising aligning the one of the plurality of grooves with the at least one variable-bore ram by tensioning the landing string.

21. The method of claim 18, further comprising sliding an umbilical in a second axial passageway, wherein the umbilical is for controlling at least one of completion tools suspended to the landing string, wherein the second axial passageway traverses through the cylindrical body, wherein the second axial passageway is radially offset from the first axial passageway, wherein the first axial passageway is located essentially along the central longitudinal axis.

22. The method of claim 21, further comprising selectively sealing a seal gland disposed in the second axial passageway at a lower end of the cylindrical body around the umbilical by applying compression.

23. The method of claim 18, further comprising shearing a shear joint connected on top of the landing string with the surface blowout preventer.

* * * * *